(12) United States Patent
Meier et al.

(10) Patent No.: US 7,631,908 B2
(45) Date of Patent: Dec. 15, 2009

(54) CLAMPING RING FOR FASTENING A GAS GENERATING CARTRIDGE

(75) Inventors: Ulrich Meier, Wadenswil (CH);
Thomas Berlep, Altenstadt (DE)

(73) Assignee: Hans Oetiker AG Maschinen- und Apparatefabrik, Horgen (CH)

( * ) Notice: Subject to any disclaimer, the term of this patent is extended or adjusted under 35 U.S.C. 154(b) by 234 days.

(21) Appl. No.: 11/574,653

(22) PCT Filed: Dec. 22, 2004

(86) PCT No.: PCT/EP2004/014629

§ 371 (c)(1),
(2), (4) Date: Mar. 2, 2007

(87) PCT Pub. No.: WO2006/074671

PCT Pub. Date: Jul. 20, 2006

(65) Prior Publication Data

US 2007/0228744 A1   Oct. 4, 2007

(51) Int. Cl.
*F16L 25/00* (2006.01)
*B65D 45/00* (2006.01)

(52) U.S. Cl. .................. 292/256; 292/262; 285/242; 285/420; 24/20 R; 24/20 CW

(58) Field of Classification Search ............. 292/262; 24/20 R, 20 TT, 20 CW, 23 R; 285/410, 285/420, 241, 242, 244, 252, 254
See application file for complete search history.

(56) References Cited

U.S. PATENT DOCUMENTS

| | | | | |
|---|---|---|---|---|
| 931,706 A | * | 8/1909 | Stevens | 439/434 |
| 1,700,451 A | * | 1/1929 | Ronci | 313/287 |
| 2,614,304 A | * | 10/1952 | Oetiker | 24/20 R |
| 3,082,498 A | * | 3/1963 | Oetiker | 24/20 R |
| 3,189,961 A | * | 6/1965 | Heller | 24/20 TT |
| 3,235,925 A | * | 2/1966 | Gerhardt et al. | 24/23 EE |
| 3,295,176 A | * | 1/1967 | Bright | 24/20 R |
| RE26,211 E | * | 5/1967 | Thurston et al. | 24/20 R |
| 3,402,436 A | * | 9/1968 | Oetiker | 24/20 R |
| 4,446,603 A | * | 5/1984 | Guiler | 24/21 |
| 4,451,955 A | * | 6/1984 | Kern et al. | 24/20 CW |
| 4,907,319 A | * | 3/1990 | Calmettes et al. | 24/20 R |
| 5,261,145 A | * | 11/1993 | Jennings | 24/20 R |
| 5,305,499 A | | 4/1994 | Oetiker | |
| 5,613,281 A | * | 3/1997 | Oetiker | 24/20 R |
| 5,878,465 A | * | 3/1999 | Jenner | 24/16 PB |
| 6,052,873 A | * | 4/2000 | Cuno | 24/20 R |

(Continued)

FOREIGN PATENT DOCUMENTS

CA    2488110 A1    11/2004

(Continued)

*Primary Examiner*—Carlos Lugo

(57) ABSTRACT

A clamping ring is used to mount an air bag gas generator cartridge on a support plate. A tensioning ear is formed in the clamping ring. Further, a wave is formed in the ring to increase the holding force between the ring and the cartridge. The wave consists of two convex arches projecting outward from the ring and an inward convex arch therebetween, the apex of the inward arch being at least tangential to the circle defined by the remaining portions of the ring in the initial condition of the ring. This type of clamping ring mounting is capable of withstanding torques between the cartridge and the support plate of well above 10 Nm.

12 Claims, 1 Drawing Sheet

U.S. PATENT DOCUMENTS

| | | |
|---|---|---|
| 7,093,326 B2 | 8/2006 | Oetiker et al. |
| 7,093,808 B2 * | 8/2006 | Yuzuriha et al. ............... 248/62 |
| 7,389,568 B2 * | 6/2008 | Crockett et al. ........... 24/274 R |
| 2002/0104198 A1 * | 8/2002 | Craig, Jr. .................... 24/20 R |

FOREIGN PATENT DOCUMENTS

| | | | |
|---|---|---|---|
| DE | 3141360 A1 * | 5/1983 |
| DE | 20301398 U1 | 5/2003 |
| DE | 10329008 A1 | 7/2003 |
| DE | 20306587 U1 | 2/2007 |
| EP | 0499819 A1 | 8/1992 |
| EP | 1245891 A1 | 10/2002 |
| GB | 2101195 A | 1/1983 |

* cited by examiner

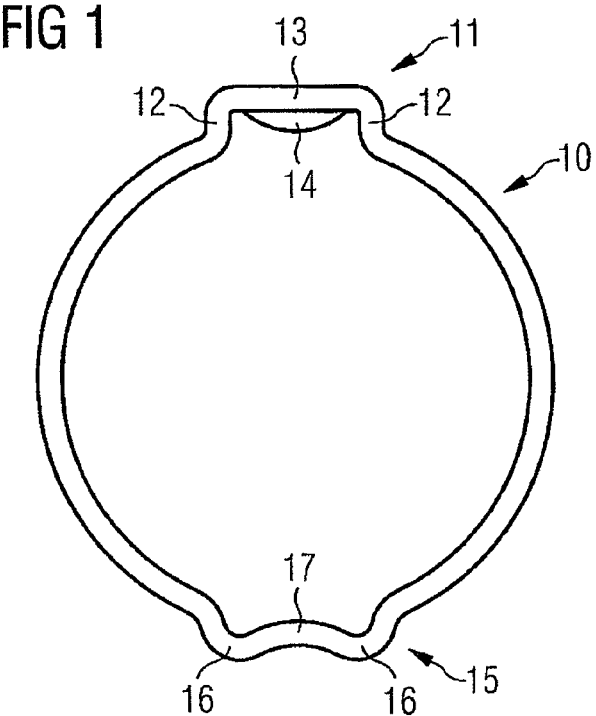
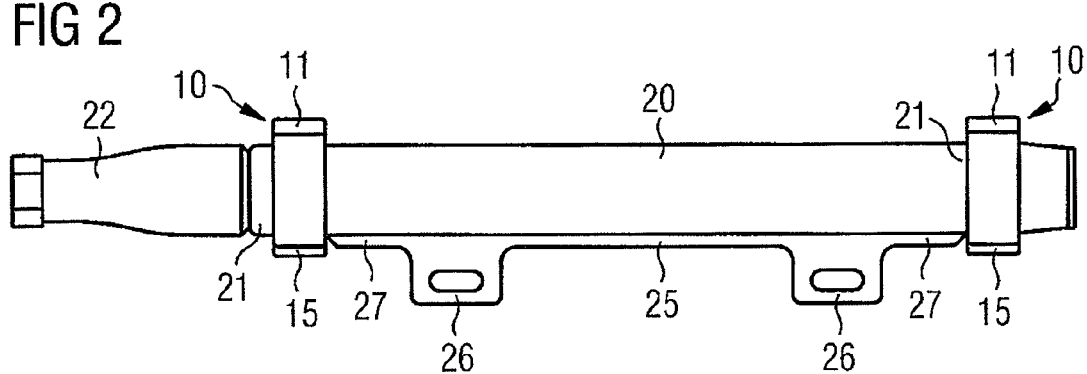
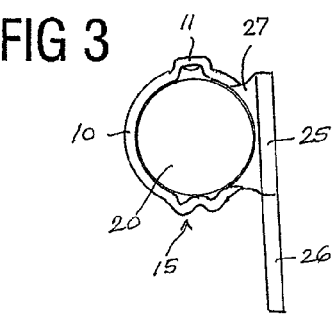

under pressure gas from the triggered cartridge 20 to be passed on via an appropriate tube, not shown. The clamping ring 10 is located behind the nipple 22 and connects the cylindrical end 21 of the cartridge 20 to a half-pipe-shaped section 26 of the support plate 25. At the right-hand end of the cartridge 20 there is a plug 23 which closes the cartridge 20 at that end and through which cables 24 are passed for triggering the cartridge 20. In this area the cartridge 20 is connected by means of a further clamping ring 10 to a half-pipe-shaped section 27 of the support plate 25.

CLAMPING RING FOR FASTENING A GAS GENERATING CARTRIDGE

PRIOR ART

Gas generator cartridges for vehicle airbags, specifically airbags for restraining the head, are often mounted on a support plate by means of two clamping rings, the support plate being mounted on the vehicle body. In view of the substantial forces which occur when the cartridge is triggered, it is required that the mounting of the cartridge on the support plate withstands a torque of at least 10 Nm.

This requirement can be met by means of screw clamps. Screw clamps, however, are expensive in manufacture and, moreover, time consuming in assembly, specifically because care must be taken that the screws are fastened with a predetermined torque to ensure the required holding force. Moreover, it has been found with screw clamps that the elasticity, which is essential for safely holding the gas generator cartridge, decreases with time.

Tests made with stepless ear clamps such as known from U.S. Pat. No. 5,305,499 have shown that a torque of up to only 3.5 Nm is achieved when the metal cartridge is directly fastened by means of a metal clamp, even if the clamp is made sufficiently heavy. Using an additional insert of rubber or plastics will achieve torques of up to about 9 Nm. Stepless ear clamps having an integrated wave-shaped elasticity reserve, such as described in WO 02/077509 A1 and corresponding U.S. Pat. No. 7,093,326, achieve values of 5 to 6 Nm in a metal/metal fastening.

DE 103 29 008 A1 and corresponding Canadian published patent application 2,488,110 discloses an open ear clamp made from band material for gas generator cartridges. This clamp is provided with a number of outward curved waves to improve its elasticity. The inner surface of the clamping ring is roughened to increase the holding force.

SUMMARY OF THE INVENTION

It is an object of the invention to avoid at least part of the disadvantages which occur with comparable clamping rings of the prior art. A more specific object resides in the provision of a clamping ring, particularly for mounting gas generator cartridges, which ensures a high torque and which is as easy to fix as possible.

This object is met by a clamping ring further including a wave formed in the ring for increasing the holding force between the ring and the object, the wave having two convex arches projecting outward from the ring and an inward convex arch therebetween, the apex of the inward arch being situated substantially on a circle defined by the remaining portions of the ring. The configuration of the clamping ring profile results in a surprisingly high holding force, which may be caused by the elastic cooperation between the tensioning ear and the wave and also by the pressure by which the inward convex arch existing between the two outward arches of the wave engage the object to be mounted, i.e., the gas generator cartridge. The tests referred to above have shown that the clamping ring according to the invention withstands torques of up to 13 Nm with a direct metal/metal engagement. At the same time, the clamping ring, which is tensioned by merely narrowing the ear, has the advantage of being easy to mount.

The inward arch having a larger radius than the outward arches is of advantage for achieving a suitable elasticity and a defined pressure between the inward arch and the cartridge. The wave being positioned diametrically opposite the tensioning ear is beneficial because of the elastic interaction between the integrated wave and the tensioning ear.

The forming the clamping ring from tubular material results in a clamping ring which is stable in shape and easy to manufacture.

The disclosed and claimed dimensions have proven suitable in clamping rings for mounting commonly available gas generator cartridges.

The reinforcing bead in the web of the tensioning ear is advantageous in terms of holding force.

The integration of part of the support plate carrying the gas generator cartridge into the clamping ring is of advantage concerning the holding force and safety of the mounting.

BRIEF DESCRIPTION OF THE DRAWING

An embodiment of the invention will be explained in detail below with reference to the drawing in which FIG. 1 is an enlarged representation of the clamping ring shown in profile;

FIG. 2 is a side view of a gas generator cartridge mounted on a support plate by means of two clamping rings according to FIG. 1; and FIG. 3 is an end view of the arrangement of FIG. 2 as seen from the right.

DETAILED DESCRIPTION OF AN EMBODIMENT

The closed clamping ring 10 shown in FIG. 1 consists of a tube section made of zinc galvanised steel which has a width of 10 mm in the axial direction, a wall thickness of 1.5 mm, and an inner diameter of 28.5 mm in the non-tensioned condition shown.

For tensioning the clamping ring 10 about an object to be mounted (not shown in FIG. 1), the clamping ring has a so-called "Oetiker ear" 11 which includes two outward extending legs 12 interconnected by a web 13. A reinforcing bead 14 is stamped into the web 13. In the embodiment shown, the inner distance between the legs, which are parallel in the non-tensioned condition, is 8 mm. The ear 11 is tensioned by being narrowed to a predetermined degree by means of a pliers-type special tool with jaws which engage the legs 12 near their inner ends.

A wave generally identified by 15 is formed in the clamping ring 10 diametrically opposite the ear 11. The wave 15 includes two outward arches 16 which extend outward from the ring 10 and an inward convex arch 17 therebetween. The outward arches 16 project 2 to 3 mm from the undeformed ring. The radius length of the overall wave 15 corresponds approximately to the width of the ear 11 in the non-tensioned condition.

The inward arch 17 is so dimensioned that its apex is at least tangential to the inner circle defined by the remaining parts of the ring. For increasing the clamping action, the inward arch 17 may be shaped such that its apex, in the initial condition, projects slightly inward beyond the above-mentioned circle. The radius of the inward arch 17 is substantially greater than that of the outward arches 16 so that the latter are comparatively stiff whereas the inward arch 17 engages the object to be clamped with a correspondingly higher elasticity.

As schematically shown in FIGS. 2 and 3, a gas generator cartridge 20 for a vehicle air bag is mounted on a support plate 25 near either one or its cylindrical ends 21 by means of a clamping ring 10 according to FIG. 1. At the left-hand end according to FIG. 2, the cartridge 20 has a nipple 22 for connection to an air bag (not shown). The support plate 25 has lateral lugs 26 for mounting on a vehicle body.

As shown in FIG. 3, the two terminal portions 27 of the support plate 25 are curved along an arc of about 120° corresponding to the outer diameter of the cylindrical ends 21 of the cartridge 20. In the assembled condition, the terminal portions 27 lie between the cartridge 20 and the respective clamping ring 10.

For mounting the gas generator cartridge 20 on the support plate 25, the cylindrical ends 21 of the cartridge are placed in the pre-bent terminal portions 27 of the support plate 25, whereupon the clamping rings 10 are slid onto the cartridge 20 and the support plate 25. By narrowing the clamping ring ears 11 by means of a pliers-type tool, which has been set to a predetermined force or predetermined distance, the metallic cartridge 20 and the metallic support plate 25 may be clamped directly into the metallic clamping ring 10 so as to achieve a torque between the cartridge 20 and the support plate 25 well above the required value of 10 Nm.

The dimensions given in the above description relate to the preferred embodiment in which a gas generator cartridge 20 to be mounted has cylindrical ends 21 of a given outer diameter (about 27 mm). With differently dimensioned objects, the clamping ring would have to be dimensioned differently, possibly also in its wall thickness and axial width.

Accordingly, it will be understood that the preferred embodiment of the present invention has been disclosed by way of example and that other modifications and alterations may occur to those skilled in the art.

What is claimed is:

1. A clamping ring for mounting an object comprising:
    a tensioning ear formed in the ring and having two outward extending legs interconnected by a web; and
    only one wave formed in the other wise smooth ring diametrically opposed the tensioning ear, the wave having two convex arches projecting outward from the ring and an inward convex arch therebetween, the apex of the inward arch being situated substantially on a circle defined by the remaining portions of the ring;
    wherein, in use, the tensing ear is tensioned by being narrowed to a predetermined degree and the inward convex arch of the wave will engage one of the object and a support on which the object is being mounted for increasing the holding force between the ring and the object.

2. The clamping ring of claim 1, wherein the inward arch has a larger radius than the outward arches.

3. The clamping ring of claim 1, which is made of tubular material.

4. The clamping ring of claim 3, wherein the tubular material has a wall thickness of 1 to 2 mm.

5. The clamping ring of claim 3, wherein the tubular material has a wall thickness of 1.5 mm and an axial width of 10 mm.

6. The clamping ring of claim 1 having an axial width of 8 to 15 mm.

7. The clamping ring of claim 1, wherein the outward arches have a maximum height of 2 to 3 mm with respect to the undeformed ring.

8. The clamping ring of claim 1, wherein the outward arches are mutually spaced 8 to 12 mm for an inner ring diameter in the range from 25 to 35 mm.

9. The clamping ring of claim 1 having a reinforcing bead stamped into the web of the tensioning ear.

10. A support structure for an airbag gas generator cartridge comprising a clamping ring according to claim 1 and a support plate, wherein the support plate has a portion curved corresponding to a cylindrical portion of the cartridge, the clamping ring surrounding the cartridge and the support plate in this area.

11. The support structure of claim 10, wherein the curved portion of the support plate surrounds the cartridge through an arc of 90° to 150°.

12. The support structure of claim 11, wherein the curved portion of said support plate surrounds said cartridge through an arc of 120°.

* * * * *